(12) United States Patent
Kalluri

(10) Patent No.: US 11,699,105 B2
(45) Date of Patent: *Jul. 11, 2023

(54) SYSTEMS AND METHODS FOR ANALYZING A LIST OF ITEMS USING MACHINE LEARNING MODELS

(71) Applicant: Oracle International Corporation, Redwood Shores, CA (US)

(72) Inventor: Sudhakar Kalluri, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,841

(22) Filed: Sep. 16, 2022

(65) Prior Publication Data

US 2023/0012803 A1 Jan. 19, 2023

Related U.S. Application Data

(63) Continuation of application No. 16/814,032, filed on Mar. 10, 2020, now Pat. No. 11,475,364.

(51) Int. Cl.
*G06F 40/30* (2020.01)
*G06N 20/00* (2019.01)
*G06F 16/28* (2019.01)
*G06Q 30/0204* (2023.01)

(52) U.S. Cl.
CPC .......... *G06N 20/00* (2019.01); *G06F 16/285* (2019.01); *G06F 40/30* (2020.01); *G06Q 30/0205* (2013.01)

(58) Field of Classification Search
CPC ........ G05N 20/20; G06F 16/285; G06F 40/30

USPC ................. 709/220, 224, 226, 228
See application file for complete search history.

(56) References Cited

U.S. PATENT DOCUMENTS

| | | | |
|---|---|---|---|
| 9,514,414 B1* | 12/2016 | Rosswog | G06N 5/04 |
| 10,970,485 B1* | 4/2021 | Shi | G06F 40/289 |
| 2007/0220928 A1* | 9/2007 | Valent | F16F 15/28 68/212 |
| 2009/0076887 A1* | 3/2009 | Spivack | G06F 40/30 705/14.69 |
| 2009/0077062 A1* | 3/2009 | Spivack | G06F 40/30 707/999.005 |
| 2009/0077124 A1* | 3/2009 | Spivack | G06F 16/25 |
| 2017/0220928 A1 | 8/2017 | Hajizadeh | |
| 2018/0060892 A1* | 3/2018 | White | G06Q 30/0205 |
| 2018/0150548 A1 | 5/2018 | Shah et al. | |
| 2018/0211171 A1* | 7/2018 | Kirk | G06N 5/045 |

(Continued)

FOREIGN PATENT DOCUMENTS

| | | | | |
|---|---|---|---|---|
| CA | 2877430 A1 * | 12/2013 | | G06N 20/00 |
| CA | 3036448 A1 | 9/2019 | | |
| EP | 3537345 A1 | 9/2019 | | |

*Primary Examiner* — Khanh Q Dinh
(74) *Attorney, Agent, or Firm* — Invoke (57) ABSTRACT

Techniques are described for training machine learning (ML) models using one or more electronic lists of items previously used in campaigns and labeled with an engagement rate corresponding to the list. A vocabulary formed from a union of the one or more lists may then be used to generate at least some items of a target recipient list. An engagement rate for the target recipient list may be inferred for the target recipient list. Natural language processing (NLP) techniques may be also be applied to optimize an engagement rate of a target recipient list and/or select content for the list.

20 Claims, 5 Drawing Sheets

(56) References Cited

U.S. PATENT DOCUMENTS

| | | | |
|---|---|---|---|
| 2018/0211172 A1* | 7/2018 | Kirk | G06N 5/045 |
| 2019/0074082 A1* | 3/2019 | Buckler | G06F 40/56 |
| 2019/0361890 A1 | 11/2019 | Rogynskyy et al. | |
| 2019/0371426 A1 | 12/2019 | Embree et al. | |
| 2020/0012886 A1 | 1/2020 | Walters et al. | |
| 2020/0210647 A1 | 7/2020 | Panuganty et al. | |
| 2021/0117868 A1 | 4/2021 | Sriharsha | |
| 2021/0224275 A1* | 7/2021 | Maheshwari | G06N 3/084 |
| 2021/0287130 A1* | 9/2021 | Kalluri | G06F 40/30 |
| 2022/0043836 A1 | 2/2022 | Upadhyay et al. | |

\* cited by examiner

SYSTEMS AND METHODS FOR ANALYZING A LIST OF ITEMS USING MACHINE LEARNING MODELS

INCORPORATION BY REFERENCE; DISCLAIMER

The following application is hereby incorporated by reference: application Ser. No. 16/814,032 filed on Mar. 10, 2020. the applicant hereby rescinds any disclaimer of claims scope in the parent application(s) or the prosecution history thereof and advise the uspto that the claims in the application may be broader that any claim in the parent application(s).

TECHNICAL FIELD

The present disclosure relates to machine learning systems and applications. In particular, the present disclosure relates to analyzing a list of items using machine learning models.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

In many applications, a training corpus of content items is processed to train a machine learning (ML) model prior to using the trained ML model to analyze a new content item. For example, a corpus of documents may include Tweets, and the ML model may be trained to classify the sentiments of new Tweets as positive or negative. Developing the ML model typically includes identifying groups of words within the training corpus. The ML model may then be applied to new material to, in the preceding example, classify the sentiment (i.e. as positive or negative) of Tweets not already classified with a sentiment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 PREDICTING AN ENGAGEMENT RATE
4.0 IDENTIFYING CONTENT FOR A TARGET RECIPIENT LIST
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS 1.0 General Overview One or more embodiments are directed to training machine learning (ML) models using one or more electronic lists of items (e.g., a list of names or user identifiers, a list of products, a list of inventory items) as a training corpus. The system forms a vocabulary from a union of lists, in which the lists of a particular union may include one or more user identifiers (e.g., user account names or other user identifier), names of one or more products, or other item identifiers. In examples in which topic modeling algorithms are applied, a vocabulary may include content items such as words, text, images, and URLs. The system generates feature vectors for each individual list of items for subsequent comparison to a target recipient list that is generated at least in part from the vocabulary. In one or more embodiments, any of a variety of natural language processing (NLP) techniques may be applied to embodiments described below.

In some embodiments, each list in the training corpus is associated with an observation metric, such as a performance metric. This may be represented by a label. A label in this context may correspond to a performance metric of the list as a whole and not a performance metric for individual list items. In one specific example, the performance metric label may indicate a rate of engagement with electronic communication transmitted in a marketing campaign to recipients on a list. For example, the label may indicate a proportion of recipients on a list that have opened the electronic communication, forwarded the electronic communication, and/or purchased a product via the electronic communication. In some examples, each list in the training corpus may include information regarding the engagement of each user individually (and not across the list as a whole).

ML feature vectors generated for each list in the training corpus also may be labeled. The labels are based on the observation associated with the recipient list. For example, a label may represent engagement data associated with a recipient list. The labeled feature vectors corresponding to the lists may be used to train an ML model. Examples of ML models include regression-based models, random forests, artificial neural networks, and support vector machines.

Once an ML model is trained using the training corpus, the ML model may be applied to a new list of items (alternatively referred to as a "target list" or "target recipient list") selected at least in part from the vocabulary. In some examples a target list may include items not in the vocabulary. These non-vocabulary items may simply be omitted from the analysis that is applied to vocabulary items. As with the training corpus, the new list may be processed to generate a feature vector for subsequent analysis by the trained ML model.

Applying an ML model to a new list generates a prediction (equivalently referred to as inference or estimation) of an empirically unknown performance metric that corresponds to the feature vector of the target list. Continuing with the example of a list of marketing campaign recipients, a designer of a marketing campaign may apply the ML model to a target list of recipients selected at least in part from a corresponding vocabulary to predict the success of a marketing campaign conducted for the target list of recipients. For example, an estimated engagement rate may be generated by the trained ML model for the target list of users. As indicated above, this engagement rate may describe a proportion of users on the target list predicted to purchase a marketed product (i.e., "convert"), forward an electronic marketing communication to another user account, or open the electronic marketing materials (e.g., whether opened at all or opened for a minimum period of time).

In some examples, a benefit of embodiments described herein is the prediction of a user engagement rate for a target list of recipients (e.g., in a marketing campaign) for which the engagement rate is not known. In some examples, the techniques described below may be used to optimize the predicted success of a marketing campaign. In one example, this optimization may be performed by analyzing multiple different target lists using the trained ML model and selecting the list having the highest expected engagement rate. Some embodiments described herein may be applied to a training corpus of recipient lists and target recipient lists that are unaccompanied by other demographic, psychographic, or behavioral information that would normally be used to predict an engagement rate. This is unusual given that, for marketing campaigns, demographic, psychographic, or behavioral information corresponding to each recipient may be averaged, aggregated, and then vectorized for use in modeling expected engagement.

One or more embodiments described in this Specification and/or recited in the claims may not be included in this General Overview section.

2.0 System Architecture

Figure 1:
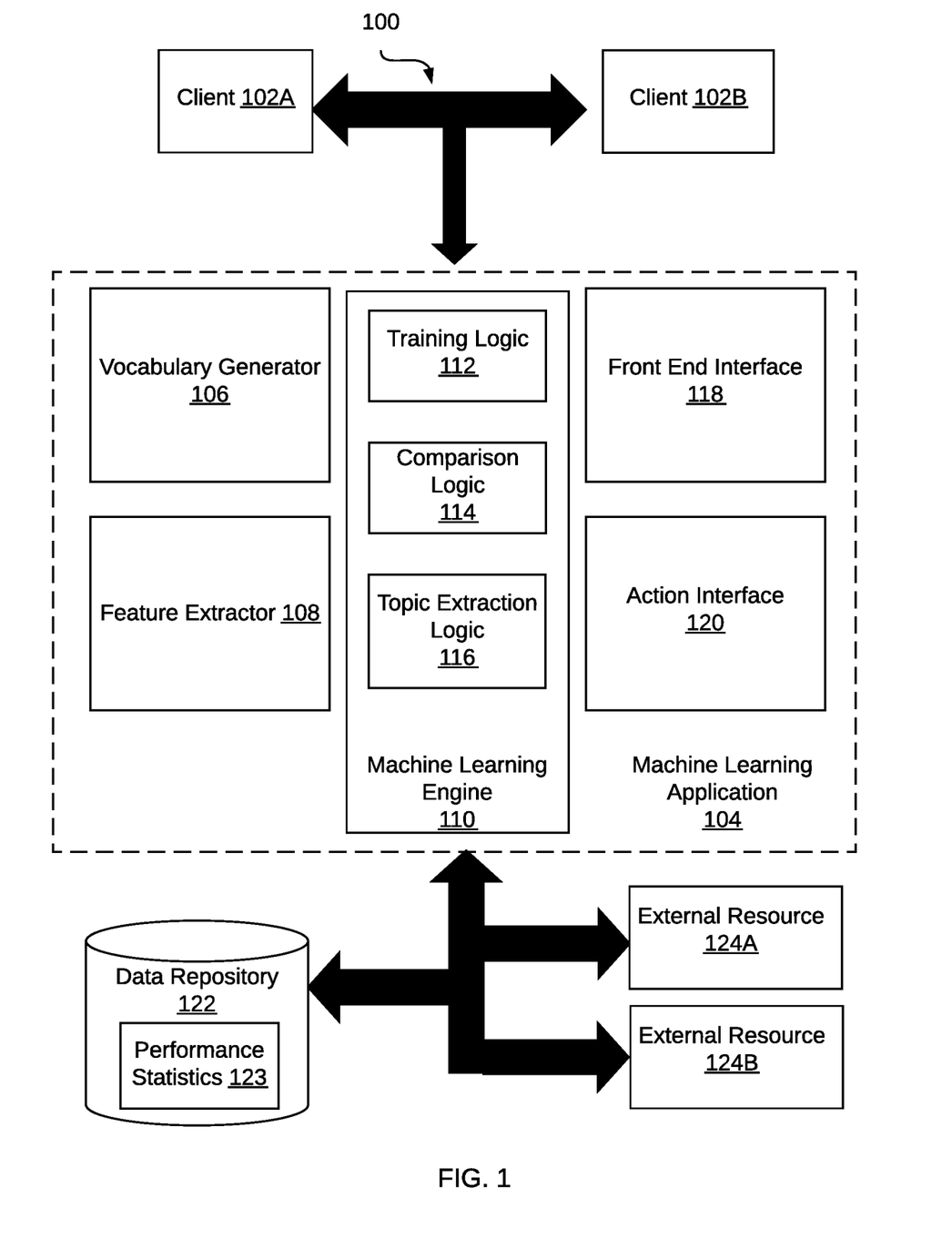
FIG. 1 illustrates an example system for constructing vocabularies and generating feature vectors for recipient lists for use in training a machine-learning application, and inferring an engagement rate for a target recipient list in accordance with some embodiments.

FIG. 1 illustrates an example system for constructing vocabularies from a list of items and the use of these vocabularies in machine-learning applications in accordance with some embodiments. As illustrated in FIG. 1, system 100 includes clients 102*a-b*, ML application 104, data repository 122, and external resources 124*a-b*. System 100 and ML application 104 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, ML application 104 provides components through which inferences and adjustments may be automatically made during application runtime rather than relying on static instruction sets to perform tasks. The components may include vocabulary generator 106, feature extractor 108, ML engine 110, front end interface 118, and action interface 120. However, as previously indicated the components of system 100, including ML application 104 may vary depending on the particular implementation.

In some embodiments, ML application 104 is a cloud service, such as a software-as-a-service (SaaS) or a web service. Clients, such as clients 102*a-b*, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In some embodiments, vocabulary generator 106 receives a set of electronic lists as input and automatically constructs a vocabulary based on the items in the lists. Examples of lists include, but are not limited to, lists of user names, lists of user identifiers (e.g., an account identifier, an email address, a username, other unique identifier), lists of product identifiers (e.g., product name, product SKU), or other lists similar lists. As indicated above, these lists need not be accompanied by associated information (e.g., demographic, psychographic, or behavioral information) commonly used in marketing campaign analyses. It will be appreciated that in some embodiments, the list used to generate the vocabulary may include this associated information, but the information may be simply omitted from vocabulary and feature vector generation. In other examples, associated information may be transformed into another feature vector that is concatenated with the vocabulary-based feature-vector. Vocabulary generator 106 may be configured to process lists that conform to any of a variety of file formats and encodings. For example, lists may be encoded as hypertext markup language (HTML), text (e.g., Microsoft Word), CSV, and/or other formats. The vocabulary generated by the vocabulary generator may, in some embodiments, include the names or identifiers of all items (e.g., usernames, other user identifiers, product names, product identifiers) on all of the lists, collectively, provided as the training corpus.

In some embodiments, feature extractor 108 is configured to identify feature values and generate feature vectors from an input list based on the vocabulary generated by the vocabulary generator 106. A feature vector may comprise a sequence of values, with each value associated with a different vocabulary word (e.g., a vocabulary word frequency). In some examples, feature vectors for different recipient lists that are generated by techniques described herein all have a same length (e.g., equal to the number of vocabulary items).

Each feature vector may be associated with a label. For example, a list of recipients used in a prior marketing campaign may include n usernames (u1, u2, un). The list may be associated with an overall observed response rate of X (i.e., equal to the number of engagements divided by n usernames exposed to the marketing message). The feature extractor 108 may process the list of n recipients to produce a feature vector, of length equal to the length ("M") of the vocabulary of all usernames, indicating a frequency ($f$), of occurrence in the list of n recipients, of each username (w—an element of the vocabulary (w1, w2, ..., wM)) of the vocabulary, thereby generating and storing an M-dimensional feature vector (e.g., {$f1, f2, \ldots, fM$}). Each feature vector corresponding to a particular list may be labeled with the engagement rate corresponding to that particular list. In one illustrative example, a feature vector corresponding to a length-6 list of users u1 to u6, selected from a length-8 vocabulary of users w1 to w8, and where u1 is identical to w4, u2 is w6, u3 is w5, u4 is w7, u5 is w2 and u6 is w1, and having an engagement rate of 50%, may be represented as {1, 1, 0, 1, 1, 1, 1, 0}, and associated with the label equal to 0.5.

In other embodiments, feature extractor 108 may append other features to the feature vector. In one example, a feature vector may be represented as [$f_1, f_2, f_3, f_4$], where $f_4$ is a non-vocabulary feature. Example non-vocabulary features may include, but are not limited to, the number of words in a list, content information associated with body text of an electronic communication (e.g., a marketing text, email, or post), data associated with a subject line of an electronic communication, or contextual information associated with the transmission of the electronic communication. Examples of contextual information may include variables describing when an electronic communication was sent, such as a time of year (e.g., a month, a week number (from 1 to 52), a date), a day of the week, a time of day, a season, and/or combinations thereof, among others.

Specific examples of feature vectors generated by the feature extractor 108 include, but are not limited to, document term frequency (TF), term frequency—inverse document frequency ("TF-IDF") vectors, transformed versions thereof (e.g., singular value decomposition), among others. In another example, such as those described above, feature vectors may also include topic model based feature vectors (either alone and/or concatenated with feature vectors generated from the vocabulary).

ML engine 110 is configured to automatically learn, from a training corpus, patterns leading to particular outcomes and to generate predicted outcomes for new examples. ML engine 110 includes training logic 112 for training ML models, comparison logic 114 for performing similarity comparisons between feature vectors generated by the feature extractor 108 for estimating unknown labels for new examples, and topic extraction logic 116 for executing latent topic analysis on the training corpus.

The training logic 112 may receive feature vectors from the feature extractor 108 and execute ML training algorithms to build a ML model. As described here, the trained ML model may then be used to infer or predict a performance metric for a feature vector associated with a target list. In some examples, the training logic 112 is configured to execute supervised ML models on feature vectors that include a performance metric label thereby training the ML model. One example of such a feature vector includes a recipient list of a marketing campaign with an engagement rate indicating the proportion of recipients that engaged the electronic marketing communication. Another example of such a feature vector is that of a list of product names or product identifiers. In this latter example, the performance metric associated with the list is that of an inventory level, an inventory residence time, a revenue, or other similar measurement. Example ML training algorithms and ML models include, but are not limited to, supervised learning algorithms (e.g., neural networks, linear regression, non-linear regression, random forest).

The comparison logic 114 may be used to determine similarities between feature vectors generated from the training corpus of recipient lists provided by the feature extractor 108 and feature vectors generated from one or more new (or "target") lists. For example, a new feature vector corresponding to a target list formed from a vocabulary may be compared to one or more feature vectors used in the training corpus. The comparison logic 114 may be used to determine a similarity between the new feature vector and one or more of the training corpus feature vectors. Examples of comparison algorithms include, but are not limited to, cosine similarity, or any other similarity analysis techniques for Euclidean or non-Euclidean space feature vectors. Regardless of the comparison algorithm used, a first subset of recipient lists in the training corpus can be identified. This first subset may be selected based on a similarity score (or equivalently "similarity criteria") relative to the target list feature vector above a threshold, a rank (e.g. top 10, top 10%), or other technique by which those recipient lists more relevant to the target list are identified.

The comparison logic 114 may generate an expected engagement rate for the target list using the comparison analysis described above. For example, the performance metric labels of the first subset may be identified and used to determine an estimated (or predicted) response rate for the target list. In one example, the labels of the first subset may be averaged to determine the target list response rate. Weighted averages (e.g., weighted based on the similarity score with the target list), as well as other techniques for combining the various labels of the first subset may be used to determine the performance metric label for the target recipient list.

The topic extraction logic 116 embodies one example of a natural language processing technique that may optionally be applied in some examples. In some examples, the topic extraction logic 116 may operate in cooperation with the feature extractor 108 and the vocabulary generator 106. For example, the topic extraction logic 116 may receive content information associated with one or more of the lists of the training corpus. Content may include text, words, images, URLs, and combinations thereof. Furthermore, each content item (e.g., a subject line in an email, body text in an email, images) may contain more than one topic. Analogous to techniques described above, a vocabulary may be generated from content information by the vocabulary generator 106. Content vectors may then be generated by operation of a topic modeling algorithm in the topic extraction logic 116 on one or both of the recipient lists and/or content into any of a variety of feature vectors for latent topic analysis. Examples of feature vectors commonly used in latent topic modeling include, but are not limited to TF-IDF, or term frequency count vectors. A set of topics may be determined for a corpus of content. This may thus provide a distribution for each topic over a vocabulary of terms (e.g., words, images) generated from a corpus of content. Examples of topic modeling algorithms include, but are not limited to, latent Dirichlet allocation (LDA) or correlated topic modeling (CTM). It will be appreciated that other types of vectors may be used in probabilistic analyses of latent topics. Embodiments that include topic modeling are described below in Section 4.0.

In some examples, topic extraction techniques may be used to transform a word frequency vector into a vector denominating the proportional representation of topics in the recipient list. In one example, this may be accomplished by generating a plurality of content feature vectors, using a topic modeling algorithm, that are based on content (e.g., subject line, body text, images, link) associated with recipient lists of the training corpus. A content feature vector may similarly be generated for the target list based on its associated content. The content feature vectors of the plurality of recipient lists may be concatenated with the previously described feature vectors (e.g., term frequency feature vectors based on the recipient vocabulary) and the content feature vector of the target list may be similarly concatenated with the previously described feature vector (e.g., term frequency vector) of the target list. ML training may then use the concatenated feature vectors of the recipient lists and a performance label that may be inferred for the target concatenated feature vector as described herein. Alternatively, a topic modeling algorithm may be applied to the plurality of recipient lists of the training corpus to transform the previously described feature vectors (each such feature vector generated based on vocabulary term frequency in the corresponding recipient list) into a transformed feature vector. The training operation and prediction operations described herein may then be performed using these transformed feature vectors. In one embodiment, this use of transformed feature vectors may precede and supplement the concatenation techniques described above so that content feature vectors are concatenated with the corresponding transformed feature vectors (e.g., corresponding to the same one of the training set recipient list target list) of one or more of the training corpus and/or the target list. In another example, any of the preceding techniques may be optionally tailored by identifying a first subset of recipient lists in a training corpus of recipient lists meeting a similarity criteria with a target reception list. A performance metric label associated with each recipient list in the first subset may be identified and based on these identified labels, a performance metric label for a target recipient list may be determined (e.g., by averaging the labels associated with the first subset). The topic modeling techniques previously described may be applied to these.

Front end interface 118 manages interactions between the ML application 104 and clients 102a-b. For example, a client may submit requests to perform various functions and view results through the front end interface 118. A client in this context may be a computing device operated by a human user, such as a marketing administrator or inventory manager. In another context, the clients 102a-b may be another application, such as a shell or client application.

In some embodiments, front end interface 118 is a presentation tier in a multitier application. Front end interface 118 may process requests received from clients, such as clients 102a-b, and translate results from other application tiers into a format that may be understood or processed by the clients. Front end interface 118 may be configured to render user interface elements and receive input via user interface elements. For example, front end interface 118 may generate webpages and/or other graphical user interface (GUI) objects. Client applications, such as web browsers, may access and render interactive displays in accordance with protocols of the internet protocol (IP) suite. Additionally, or alternatively, front end interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 120 provides an interface for executing actions using computing resources, such as external resources 124a-b. Action interface 120 may include an API, CLI, or other interface for invoking functions to execute actions. One or more of these functions may be provided through cloud services or other applications, which may be external to ML application 104. For example, one or more components of system 100 may invoke an API of an email client application to transmit a targeted marketing email message to a list of recipients. As another example, an API of a publishing tool may be invoked to trigger a targeted social media post to one or more social media platforms for a list of social media users. In yet another example, action interface 120 may submit commands to reconfigure software and/or hardware resources on a given list. Thus, the actions that are performed may vary from implementation to implementation.

In some embodiments, actions may be automatically triggered based on outputs received from ML engine 110. For example, action interface 120 may trigger an action for a given list of recipients if the estimated label satisfies a particular threshold. In the context of campaign analytics, for instance, action interface 120 may publish a targeted marketing campaign message to a given list of recipients if and only if the predicted engagement rate exceeds a threshold. Additionally, or alternatively, other actions may also be triggered depending on the particular implementation. Additionally, or alternatively, actions may be triggered responsive to client requests received through front end interface 118.

In some embodiments, data repository 122 stores data generated and/or otherwise accessed by components of ML application 104. Example data may include, but is not limited to, trained ML models, generated vocabularies, generated feature vectors, GUI data, and electronic files. Electronic files may include lists. In an example of lists of user identifiers used for a marketing campaign stored in data repository 122, each list may correspond to an engagement rate label that is stored in performance statistics store 123. In an example of lists of products identified in one or more marketing campaigns, each list stored in the data repository 122 may be associated with a sales (or "conversion") rate that is stored in the performance statistics store 123. In an example of lists of products identified in an inventory, each list may be associated with a proportion of the products that are present or not present in the inventory.

Data repository 122 may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Further, data repository 122 may be implemented or may execute on the same computing system as one or more other components of system 100. Alternatively, or additionally, data repository 122 may be implemented or executed on a computing system separate from one or more other components of system 100. Data repository 122 may be communicatively coupled to one or more components illustrated in system 100 via a direct connection or via a network.

In some embodiments, external resources 124a-b are network services that are external to ML application 104. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources 124a-b. Action interface 120 may process and translate inbound requests to allow for further processing by other components of ML engine 110. Action interface 120 may store, negotiate, and/or otherwise manage authentication information for accessing external resources 124a-b. Example authentication information may include, but is not limited to, digital certificates, cryptographic keys, usernames, and passwords. Action interface 120 may include authentication information in the requests to invoke functions provided through external resources 124a-b.

Additional embodiments and/or examples relating to computer networks and microservice applications are described below in Section 5.0, titled "Computer Networks and Cloud Networks" and Section 6.0, titled "Microservice Applications".

3.0 Predicting Engagement Rate

Figure 2:
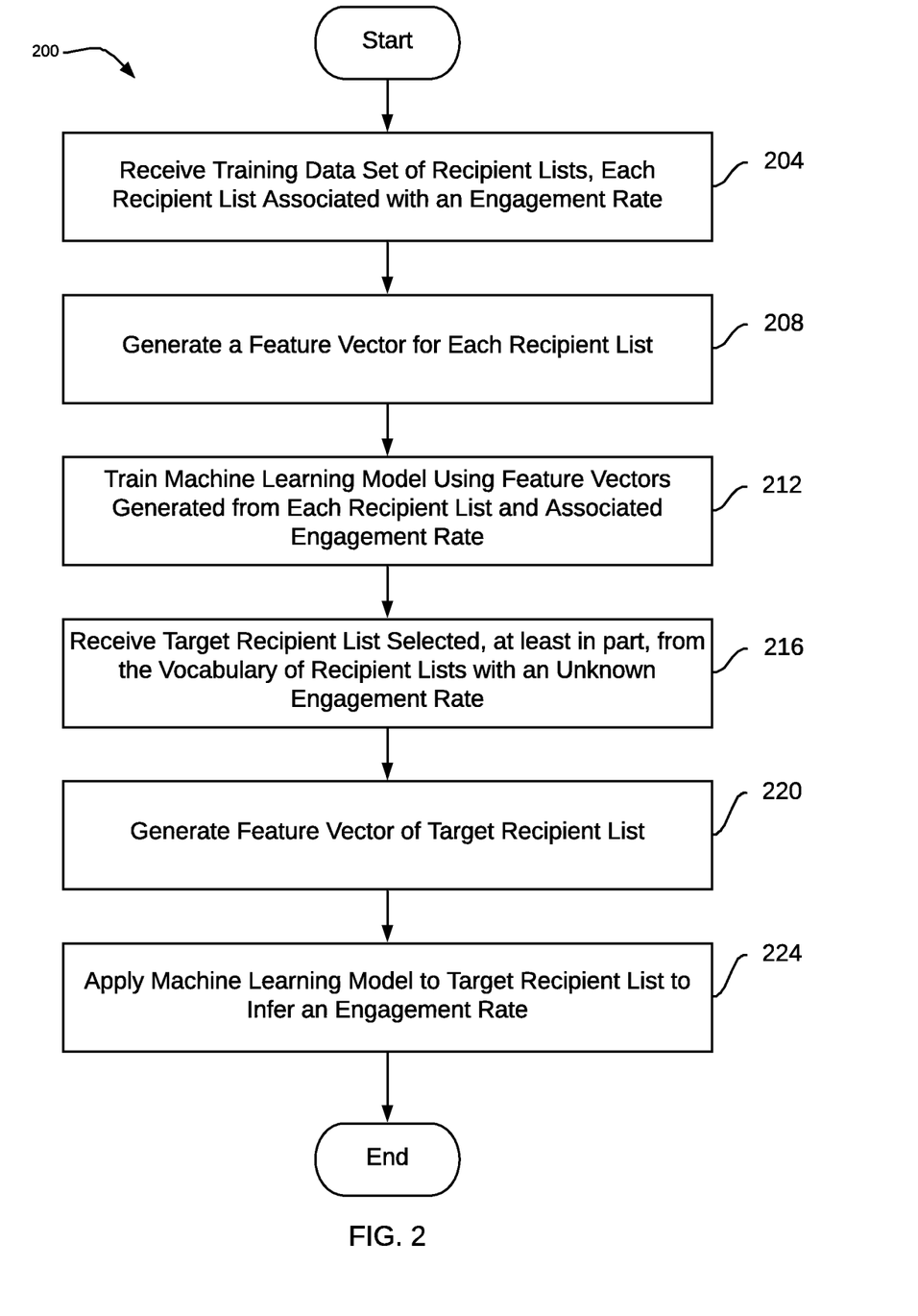
FIG. 2 illustrates an example set of operations for inferring an engagement rate for a target recipient list in accordance with some embodiments.

FIG. 2 illustrates one example application for some embodiments of the present disclosure. In this example, the techniques and systems described above may be used to predict an engagement rate of a new recipient list (equivalently referred to as a target recipient list) generated at least in part from a vocabulary, for which an engagement rate is not known. One or more operations illustrated in FIG. 2 may be modified, rearranged, or omitted. Accordingly, the particular sequence of operations illustrated in FIG. 2 should not be construed as limiting the scope of one or more embodiments.

The method 200 may begin by first receiving one or more recipient lists, each of which is associated with an engagement rate (operation 204). The collection of these recipient lists may be used as the training corpus for the ML model and further be used by the vocabulary generator 106 to generate a vocabulary, as described above.

Once the recipient lists of the training corpus are received, feature vectors may be generated for each of the received recipient lists by feature extractor 108 (operation 208). This process of feature vector generation is shown in more detail in the context of methods 300, 316 illustrated in FIG. 3.

Figure 3:
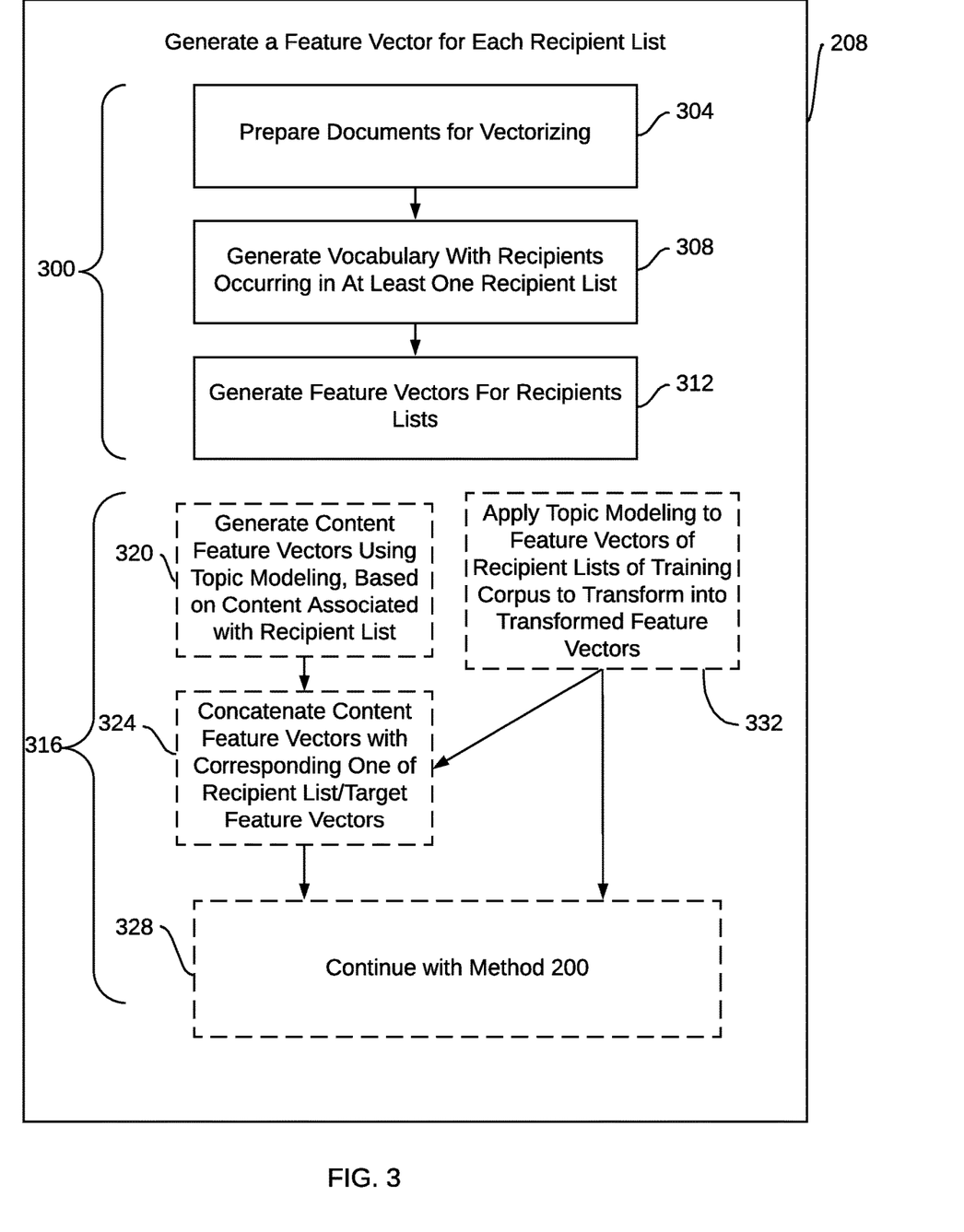
FIG. 3 illustrates an example set of operations for generating feature vectors from lists in a training corpus, each feature vector corresponding to an individual recipient list in accordance with some embodiments.

Turning to the method 300 in FIG. 3, the electronically received recipient lists may be prepared for vectorizing (operation 304).

A vocabulary may then be generated from the received recipient lists. The vocabulary may include all recipients occurring in at least one recipient list (operation 308). Individual feature vectors are then generated for each recipient list (operation 312). One or more of the recipient lists may also be associated with a value indicating an engagement rate for the list as a whole. This value may be used to label the feature vector corresponding to each list.

In an optional variation, the example method 316 shows one example by which topic analysis algorithms may be used in addition to the method 200. As described above in the context of the feature extractor 108 and topic extraction logic 116, content feature vectors may be generated based on content associated with the recipient lists (operation 320). These content feature vectors may be concatenated with the corresponding recipient list or target list feature vectors (operation 324). These may be used in any subsequent operations of the method 200 (operation 328). Alternatively, or additionally, topic modeling algorithms may be applied to recipient frequency feature vectors of the recipient lists of the training corpus to transform these into transformed feature vectors (operation 332). These transformed feature vectors may be combined with the concatenated feature vectors of operation 324 or simply used in the remaining operations of the method 200 (operation 328).

Returning to FIG. 2, a machine learning model (operation 212) may be trained using feature vectors generated from the recipient lists and their corresponding labels. "Contextual information" may also be associated with a particular list as an additional input to the machine learning model. Examples of contextual information include, but are not limited to, a time of year at which an electronic communication was transmitted, a time of day, among other similar information (described above). "Content information" may also be used as an input to the machine learning model. Examples of content information include body text of an electronic communication (e.g., email, text, Tweet text/sentiment, social networking post), subject line text of an electronic communication, image content, links, brand names, and other similar information that is included in an electronic communication distributed to users on a list. The content information may also be analyzed using topic modeling tools, in embodiments described in Section 4.0.

A new target recipient list may be received (operation 216). The target recipient list includes one or more of the recipients from the recipient lists used to generate the vocabulary and train the machine learning model. As indicated above, the target recipient list may additionally include recipients not in the vocabulary. These unknown recipients may simply be omitted from the analysis. However, the target recipient list does not include an engagement rate. This is because a new communication (e.g., associated with a new marketing campaign) to the target recipient list has yet to be transmitted, or has been transmitted but the recipient engagements/responses have not yet been recorded, and thus lacks an observed engagement rate.

A feature vector is generated from the target recipient list (operation 220) using any of the feature vector techniques described above. At least one of the individual recipients of the target recipient list appear in at least one list used to generate the vocabulary.

To infer an expected engagement rate associated with the target recipient list (e.g., for a new marketing campaign or other electronic communication), the machine learning model may be applied to the target recipient list (operation 224). Examples of predictive models that may be used to predict an engagement rate associated for the target recipient list (as a whole, and not on an individual recipient basis) include, but are not limited to regression analysis models, neural networks, and similarity analysis models. Upon operation of the machine learning model on the target recipient list, an inferred (or expected) engagement rate is produced.

4.0 Identifying Content for a Target List

In some embodiments, generating individual feature vectors that correspond to each list (of the training corpus and the target list) advantageously enables application of natural language processing (NLP) techniques. In one example, NLP techniques may be used to select content to be communicated to a target list of user identifiers. In some cases, a trained ML model may be used to select a target list that optimizes an engagement rate of the target list as a whole.

Figure 4:
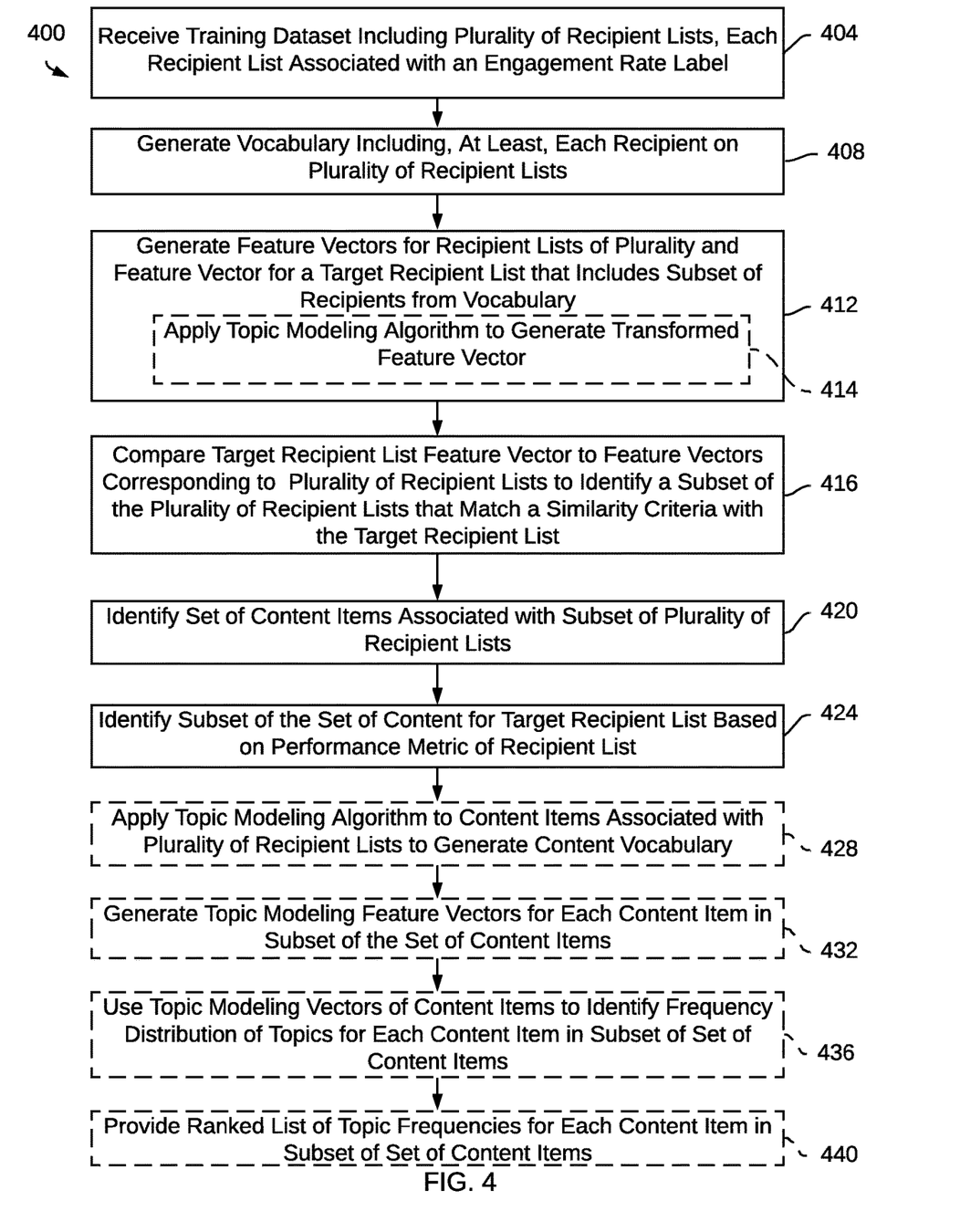
FIG. 4 illustrates an example set of operations for selecting content to transmit to a target recipient list based on a similarity of the target recipient list to one or more recipient lists in the training corpus in accordance with some embodiments.

One embodiment of such a technique is illustrated as a method 400 in FIG. 4. The method 400 begins with operations similar to those described above in the context of FIG. 2. A training dataset of a plurality of recipient lists and corresponding performance metric labels is received (operation 404). A vocabulary is generated that includes at least each recipient from the plurality of lists (operation 408). A feature vector for a target recipient list may be generated (operation 412). The feature vector of the target recipient list may be compared to the feature vectors of the recipient lists of the training dataset (operation 416). As described above, any of a variety of comparison techniques may be used. These may include cosine similarity, or any other similarity analysis techniques for Euclidean or non-Euclidean space feature vectors.

The similarity analysis may identify a subset of recipient lists in the training corpus having a similarity score relative to the target recipient list above a threshold (i.e., having a minimum level of similarity or greater) (operation 416). In one embodiment, the subset of recipient lists may be ranked based on the similarity score relative to the target list, with those of the subset being more similar to the target list being ranked higher. Once identified, the subset may be further analyzed to determine a set of content items associated with the subset of the plurality of recipient lists (operation 420) A subset of the set of content items may be identified based on the performance metric associated with the subset of recipient lists (operation 424).

In some embodiments, the method 400 may be modified by optionally applying a topic modeling algorithm to the feature vectors of the plurality of recipient lists and the target recipient (operation 414). Analogous to the description of the method 316, this changes these feature vectors into corresponding "transformed" feature vectors. The transformed feature vectors associated with the plurality of recipient lists and the transformed target feature vector can then be compared (operation 416) and the remainder of the method 400 performed as described above.

In another optional variation of the method 400, upon identifying the subset of content items of the set of content items (operation 424), a topic modeling algorithm may be applied to the content items associated with the plurality of recipient lists (operation 428). In some embodiments, operation 428 may be performed during training (e.g., between operations 404 and 408) or between operations 402 and 424. This generates a content vocabulary, and other topic model parameters, associated with the plurality of content items. Based on the vocabulary, topic modeling feature vectors may be generated for each content item in the subset of the set of content items (operation 432). These topic modeling feature vectors may then be used to identify frequency distributions of topics for each content item, and even identify a most frequently occurring topic for each content item in cases in which some content items include multiple topics (operation 436). A ranked list of topic frequencies may then be provided for each content item (operation 440). In some examples, a topic is simply a probability distribution over vocabulary terms (e.g., words in the case of text content). This probability distribution may be sorted to produce the ranked list of terms, thus identifying the most frequently occurring terms across the vocabulary for a topic. A union of the most frequently occurring terms across the vocabulary for each topic, across the most frequent topics determined as described above for each content item, may be used to identify content items to transmit to a target list.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In some examples, natural language processing techniques may be applied to select content for the target recipient list.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease or delete the threshold. Additionally, or alternatively, the input might request the microservice application to create new in-application alert thresholds. The in-application alerts may trigger alerts to the user while logged into the application or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
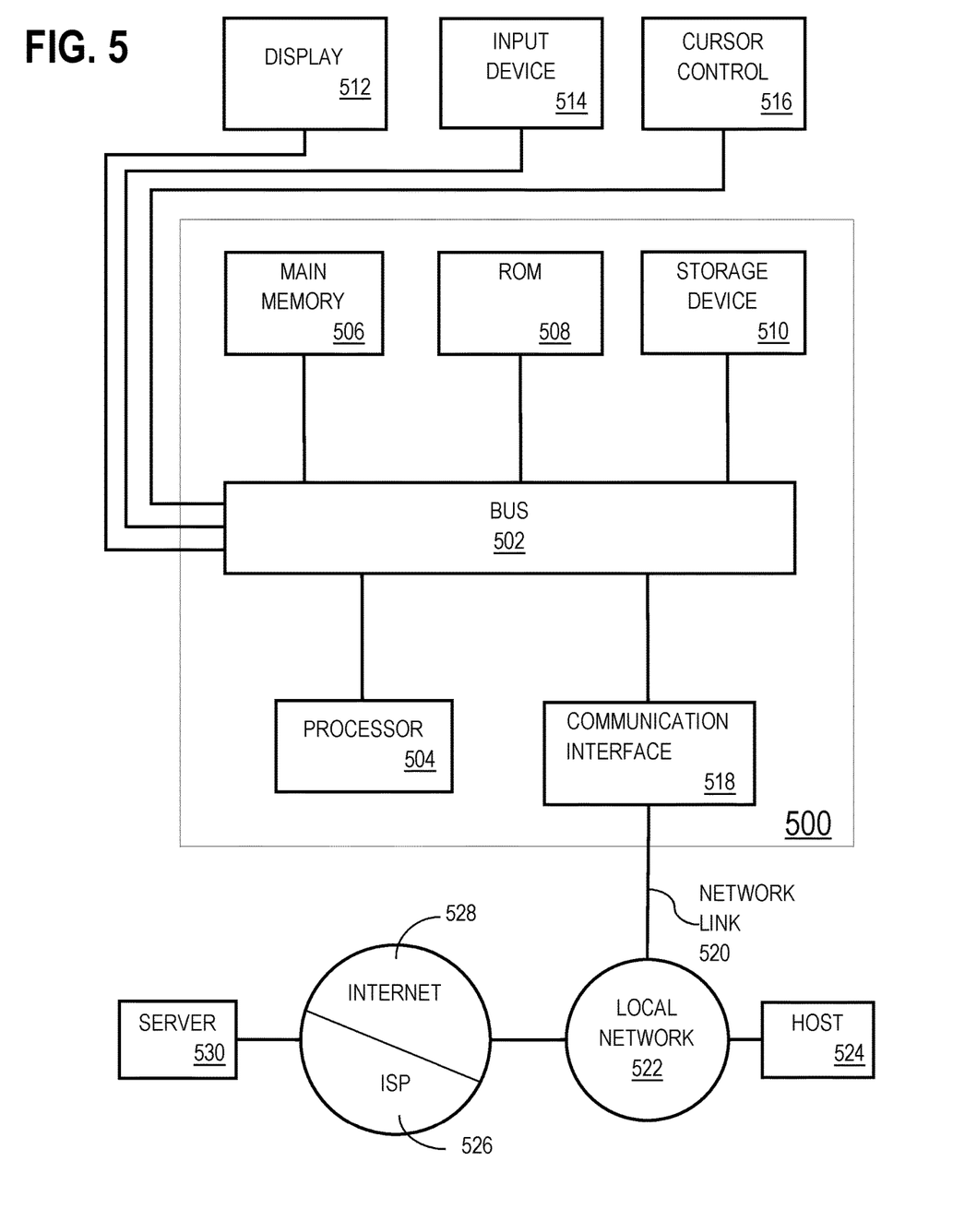
FIG. 5 shows a block diagram that illustrates a computer system in accordance with one or more embodiments.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media may also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer may load the instructions into its dynamic memory and send the instructions over a network line, such as a telephone line, a fiber optic cable, or a coaxial cable, using a modem. A modem local to computer system 800 may receive the data on the network line and use an infra-red transmitter to convert the data to an infra-red signal. An infra-red detector may receive the data carried in the infra-red signal and appropriate circuitry may place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 may send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the inventors to be the scope of the invention, is the literal and equivalent scope of the set of claims that issue from this application, in the specific form in which such claims issue, including any subsequent correction.

What is claimed is:

1. One or more non-transitory computer-readable media storing instructions that, when executed by one or more hardware processors, cause performance of operations comprising:
   obtaining a training dataset comprising a plurality of recipient lists and, for each particular recipient list in the plurality of recipient lists, a respective value of a performance metric;
   generating a vocabulary comprising each recipient from the plurality of recipient lists;
   generating, for each particular recipient list, a respective feature vector that is (a) based at least in part on which recipients in the vocabulary occur in the particular recipient list and (b) associated with the respective value of the performance metric;
   training a machine learning model, based at least in part on the respective feature vector and the respective value of the performance metric for each particular recipient list;
   applying the machine learning model to a plurality of candidate recipient lists, to obtain a respective prediction of the performance metric for each candidate recipient list in the plurality of candidate recipient lists;
   selecting, based at least in part on the respective prediction of the performance metric for each candidate recipient list, a target recipient list from the plurality of candidate recipient lists.

2. The one or more non-transitory computer-readable media of claim 1, the operations further comprising:
   generating a respective feature vector for each candidate recipient list;
   wherein applying the machine learning model to the plurality of candidate recipient lists uses at least the respective feature vector for each candidate recipient list.

3. The one or more non-transitory computer-readable media of claim 2, the operations further comprising:
   obtaining contents associated respectively with the plurality of recipient lists;
   generating, based at least on the contents associated respectively with the plurality of recipient lists, a respective content feature vector for each particular recipient list;
   generating, based at least on contents associated respectively with the plurality of candidate recipient lists, a respective content feature vector for each candidate recipient list;
   concatenating the respective feature vector for each particular recipient list with the respective content feature vector for each particular recipient list, to obtain a first set of concatenated feature vectors;
   concatenating the respective feature vector for each candidate recipient list with the respective content feature vector for each candidate recipient list, to obtain a second set of concatenated feature vectors;
   wherein training the machine learning model uses the first set of concatenated feature vectors and applying the machine learning model to the plurality of candidate recipient lists uses the second set of concatenated feature vectors.

4. The one or more non-transitory computer-readable media of claim 2, the operations further comprising:
   applying a topic modeling algorithm to the respective feature vector for each particular recipient list, to obtain a first set of transformed feature vectors;
   applying the topic modeling algorithm to the respective feature vector for each candidate recipient list, to obtain a second set of transformed feature vectors;
   wherein training the machine learning model uses the first set of transformed feature vectors and applying the machine learning model to the plurality of candidate recipient lists uses the second set of transformed feature vectors.

5. The one or more non-transitory computer-readable media of claim 1, wherein recipient lists in the training dataset and the plurality of candidate recipient lists comprise respective unique identifiers associated with each recipient without other associated information.

6. The one or more non-transitory computer-readable media of claim 1, wherein at least one recipient in each candidate recipient list appears in the vocabulary.

7. The one or more non-transitory computer-readable media of claim 1, wherein the performance metric comprises an engagement rate corresponding to user engagements associated with electronic communications.

8. A system comprising:
   at least one device comprising one or more hardware processors,
   the system being configured to perform operations comprising:
   obtaining a training dataset comprising a plurality of recipient lists and, for each particular recipient list in the plurality of recipient lists, a respective value of a performance metric;
   generating a vocabulary comprising each recipient from the plurality of recipient lists;
   generating, for each particular recipient list, a respective feature vector that is (a) based at least in part on which recipients in the vocabulary occur in the particular recipient list and (b) associated with the respective value of the performance metric;
   training a machine learning model, based at least in part on the respective feature vector and the respective value of the performance metric for each particular recipient list;
   applying the machine learning model to a plurality of candidate recipient lists, to obtain a respective prediction of the performance metric for each candidate recipient list in the plurality of candidate recipient lists;
   selecting, based at least in part on the respective prediction of the performance metric for each candidate recipient list, a target recipient list from the plurality of candidate recipient lists.

9. The system of claim 8, the operations further comprising:
   generating a respective feature vector for each candidate recipient list;
   wherein applying the machine learning model to the plurality of candidate recipient lists uses at least the respective feature vector for each candidate recipient list.

10. The system of claim 9, the operations further comprising:
    obtaining contents associated respectively with the plurality of recipient lists;
    generating, based at least on the contents associated respectively with the plurality of recipient lists, a respective content feature vector for each particular recipient list;

generating, based at least on contents associated respectively with the plurality of candidate recipient lists, a respective content feature vector for each candidate recipient list;
concatenating the respective feature vector for each particular recipient list with the respective content feature vector for each particular recipient list, to obtain a first set of concatenated feature vectors;
concatenating the respective feature vector for each candidate recipient list with the respective content feature vector for each candidate recipient list, to obtain a second set of concatenated feature vectors;
wherein training the machine learning model uses the first set of concatenated feature vectors and applying the machine learning model to the plurality of candidate recipient lists uses the second set of concatenated feature vectors.

11. The system of claim 9, the operations further comprising:
applying a topic modeling algorithm to the respective feature vector for each particular recipient list, to obtain a first set of transformed feature vectors;
applying the topic modeling algorithm to the respective feature vector for each candidate recipient list, to obtain a second set of transformed feature vectors;
wherein training the machine learning model uses the first set of transformed feature vectors and applying the machine learning model to the plurality of candidate recipient lists uses the second set of transformed feature vectors.

12. The system of claim 8, wherein recipient lists in the training dataset and the plurality of candidate recipient lists comprise respective unique identifiers associated with each recipient without other associated information.

13. The system of claim 8, wherein at least one recipient in each candidate recipient list appears in the vocabulary.

14. The system of claim 8, wherein the performance metric comprises an engagement rate corresponding to user engagements associated with electronic communications.

15. A method comprising:
obtaining a training dataset comprising a plurality of recipient lists and, for each particular recipient list in the plurality of recipient lists, a respective value of a performance metric;
generating a vocabulary comprising each recipient from the plurality of recipient lists;
generating, for each particular recipient list, a respective feature vector that is (a) based at least in part on which recipients in the vocabulary occur in the particular recipient list and (b) associated with the respective value of the performance metric;
training a machine learning model, based at least in part on the respective feature vector and the respective value of the performance metric for each particular recipient list;
applying the machine learning model to a plurality of candidate recipient lists, to obtain a respective prediction of the performance metric for each candidate recipient list in the plurality of candidate recipient lists;
selecting, based at least in part on the respective prediction of the performance metric for each candidate recipient list, a target recipient list from the plurality of candidate recipient lists;
wherein the method is performed by at least device comprising one or more hardware processors.

16. The method of claim 15, further comprising:
generating a respective feature vector for each candidate recipient list;
wherein applying the machine learning model to the plurality of candidate recipient lists uses at least the respective feature vector for each candidate recipient list.

17. The method of claim 16, further comprising:
obtaining contents associated respectively with the plurality of recipient lists;
generating, based at least on the contents associated respectively with the plurality of recipient lists, a respective content feature vector for each particular recipient list;
generating, based at least on contents associated respectively with the plurality of candidate recipient lists, a respective content feature vector for each candidate recipient list;
concatenating the respective feature vector for each particular recipient list with the respective content feature vector for each particular recipient list, to obtain a first set of concatenated feature vectors;
concatenating the respective feature vector for each candidate recipient list with the respective content feature vector for each candidate recipient list, to obtain a second set of concatenated feature vectors;
wherein training the machine learning model uses the first set of concatenated feature vectors and applying the machine learning model to the plurality of candidate recipient lists uses the second set of concatenated feature vectors.

18. The method of claim 16, further comprising:
applying a topic modeling algorithm to the respective feature vector for each particular recipient list, to obtain a first set of transformed feature vectors;
applying the topic modeling algorithm to the respective feature vector for each candidate recipient list, to obtain a second set of transformed feature vectors;
wherein training the machine learning model uses the first set of transformed feature vectors and applying the machine learning model to the plurality of candidate recipient lists uses the second set of transformed feature vectors.

19. The method of claim 15, wherein recipient lists in the training dataset and the plurality of candidate recipient lists comprise respective unique identifiers associated with each recipient without other associated information.

20. The method of claim 15, wherein at least one recipient in each candidate recipient list appears in the vocabulary.

* * * * *

UNITED STATES PATENT AND TRADEMARK OFFICE
CERTIFICATE OF CORRECTION

| | |
|---|---|
| PATENT NO. | : 11,699,105 B2 |
| APPLICATION NO. | : 17/946841 |
| DATED | : July 11, 2023 |
| INVENTOR(S) | : Kalluri |

It is certified that error appears in the above-identified patent and that said Letters Patent is hereby corrected as shown below:

In the Specification

In Column 4, Line 63, delete "(u1, u2, un)." and insert -- (u1, u2, ..., un). -- therefor.

Signed and Sealed this
Fifteenth Day of October, 2024

Katherine Kelly Vidal
*Director of the United States Patent and Trademark Office*